United States Patent
Lin et al.

(10) Patent No.: US 12,415,236 B2
(45) Date of Patent: Sep. 16, 2025

(54) METHOD, APPARATUS, AND NON-TRANSITORY COMPUTER READABLE MEDIUM FOR DETECTING WELDING DEFECTS OF WORKPIECES

(71) Applicant: Fulian Yuzhan Precision Technology Co., Ltd, Shenzhen (CN)

(72) Inventors: Tsung-Ju Lin, New Taipei (TW); Meng Wang, Shenzhen (CN); Cheng-Lun Lee, New Taipei (TW); Chen-Ting Wu, New Taipei (TW); Huang-Ming Tseng, New Taipei (TW)

(73) Assignee: Fulian Yuzhan Precision Technology Co., Ltd, Shenzhen (CN)

( * ) Notice: Subject to any disclaimer, the term of this patent is extended or adjusted under 35 U.S.C. 154(b) by 961 days.

(21) Appl. No.: 17/538,084

(22) Filed: Nov. 30, 2021

(65) Prior Publication Data
US 2022/0088719 A1    Mar. 24, 2022

(30) Foreign Application Priority Data
Dec. 17, 2020   (CN) .......................... 202011497659.4

(51) Int. Cl.
| | | |
|---|---|---|
| *B23K 31/12* | (2006.01) | |
| *B23K 31/00* | (2006.01) | |
| *G06N 3/08* | (2023.01) | |
| *G06T 7/00* | (2017.01) | |

(52) U.S. Cl.
CPC .......... *B23K 31/125* (2013.01); *B23K 31/006* (2013.01); *G06N 3/08* (2013.01); *G06T 7/0008* (2013.01); *G06T 2207/20081* (2013.01); *G06T 2207/20084* (2013.01); *G06T 2207/30164* (2013.01)

(58) Field of Classification Search
CPC ...... B23K 31/125; B23K 31/006; G06N 3/08; G06N 3/045; G06N 3/088; G06T 7/0008; G06T 2207/20081; G06T 2207/20084; G06T 2207/30164; G06T 7/0004; G06T 2207/30152; G06T 2207/10004; G01N 21/8851; G01N 2021/8887
See application file for complete search history.

(56) References Cited

U.S. PATENT DOCUMENTS

2017/0032281 A1* 2/2017 Hsu .................. G05B 19/41875

FOREIGN PATENT DOCUMENTS

| CN | 109615609 A | 4/2019 |
|---|---|---|
| CN | 111681231 A | 9/2020 |

\* cited by examiner

*Primary Examiner* — Robert G Bachner
(74) *Attorney, Agent, or Firm* — ScienBiziP, P.C.

(57) ABSTRACT

A method for detecting welding defects of workpieces includes obtaining a first image from an image capturing element; extracting welding information from the first image; transmitting the welding information to a logic processing element to obtain welding defects; the logic processing element formed by evolution of self-learning of historical welding information; and generating display information of the welding defects and displaying visual form and/or characteristics values of the welding defects. An apparatus and a non-transitory computer readable medium for detecting welding defects of workpieces are also disclosed.

17 Claims, 6 Drawing Sheets

METHOD, APPARATUS, AND NON-TRANSITORY COMPUTER READABLE MEDIUM FOR DETECTING WELDING DEFECTS OF WORKPIECES

CROSS-REFERENCE TO RELATED APPLICATIONS

This application claims priority to Chinese Patent Application No. 202011497659.4 filed on Dec. 17, 2020, the contents of which are incorporated by reference herein.

FIELD

The subject matter herein generally relates to defect-detection by imaging, and particularly to a method, an apparatus, and a non-transitory computer readable medium for detecting welding defects of workpieces.

BACKGROUND

Method for detecting welding defects of workpieces normally includes an algorithm applied to images and a deep learning for the defect detection. However, the image algorithm has disadvantage in lacking robustness and requires a high relevancy of products and images. The deep learning process requires standards of defects multiple defects and multiple locations. Once a defect standard changes, readjustment of marks and another learning process are needed.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
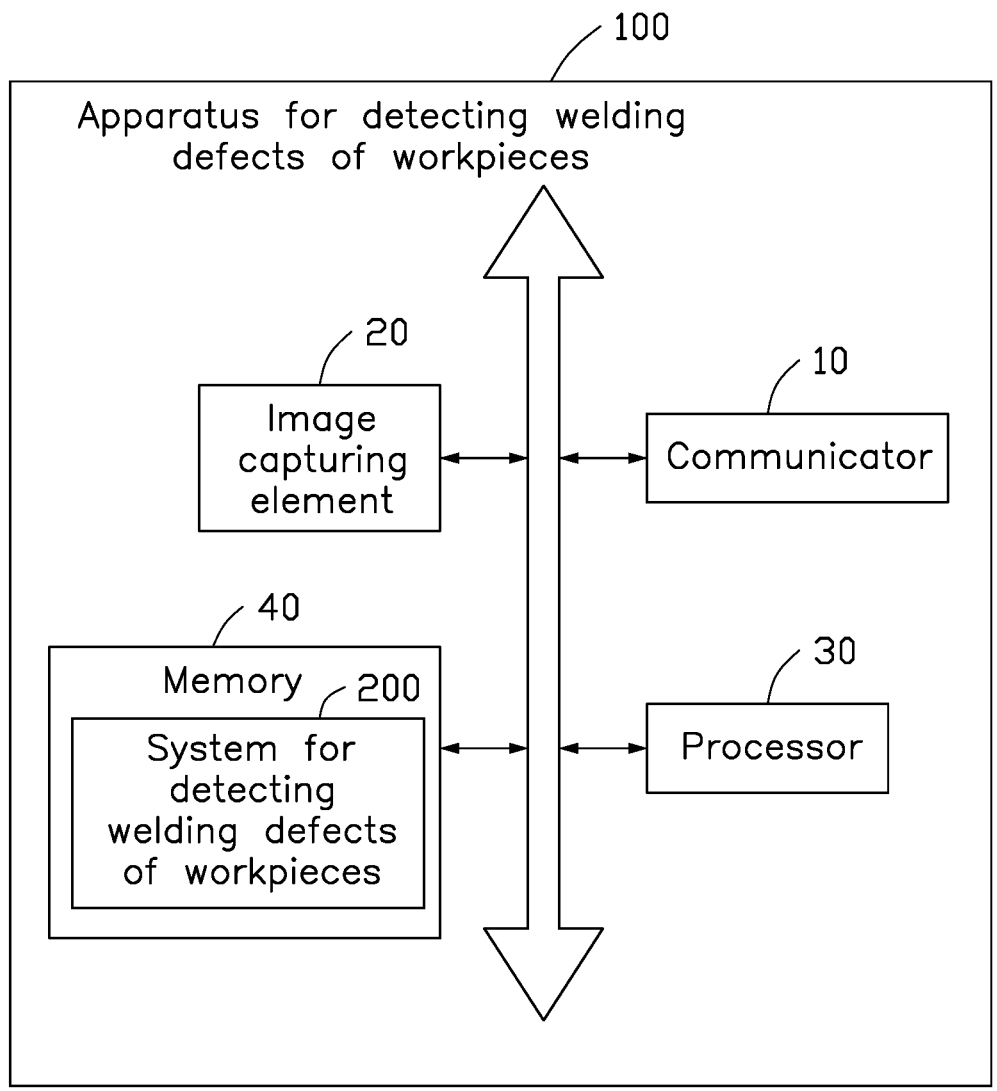
FIG. 1 is a schematic view of an embodiment of an apparatus for detecting welding defects of workpieces according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

FIG. 1 illustrates an apparatus 100 for detecting welding defects of workpieces, including a communicator 10, an image capturing element 20, at least one processor 30, and a memory 40.

The image capturing element 20 is configured to capture post-welding images of a first workpiece and a second workpiece. The first workpiece and the second workpiece can be welded together. The first workpiece can be a stub and the second workpiece can be a flange. In at least one embodiment, the image capturing element 20 can be a charge coupled device (CCD) camera. A first image of the stub and the flange welded together can be captured by the image capturing element 20, the communicator 10, the at least one processor 30, and the memory 40. Analyzing and extracting welding defects by the at least one processor 30 calls up logic processing elements in the memory. Display information is arranged for the display of welding defects detected.

The communicator 10 is configured to obtain the first image from the image capturing element 20 and transmit same to the at least one processor 30.

The at least one processor 30 can be formed by integrated circuits, such as an individual integrated circuit or multiple integrated circuits with a same function or different functions. The at least one processor 30 includes but is not limited to a central processing unit (CPU), a microprocessor, a digital signal processor (DSP), a graphics processor, an application specific integrated circuit (ASIC), a field-programmable gate array (FPGA), a data processor chip, a programmable logic device (PLD), a discrete gate/transistor logic device, or a discrete hardware component. The at least one processor 30 may be a control unit electrically connected to other elements of the apparatus 100 through interfaces or a bus. In at least one embodiment, the apparatus 100 includes a plurality of interfaces configured to communicate with other devices.

Figure 3:
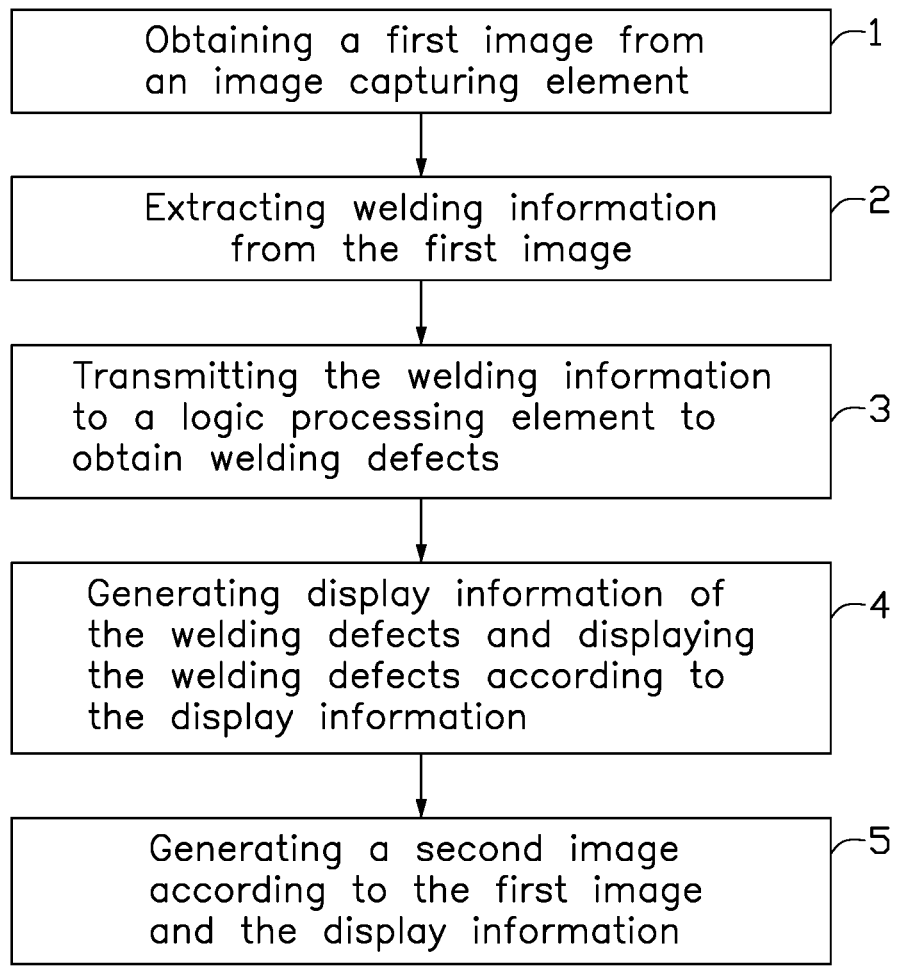
FIG. 3 illustrates a flowchart of an embodiment of a method for detecting welding defects of workpieces according to the present disclosure.

The memory 40 is configure to store data for the apparatus 100, for instance, various data bases and program codes. In at least one embodiment, the memory 40 can include various types of non-transitory computer-readable storage mediums. For example, the memory 40 can store local paths and a system 200 for presenting welding defects. The memory 40 can rapidly and automatically access instructions and data when the apparatus 100 is running. The memory 40 can be an internal storage system, such as a flash memory, a Random Access Memory (RAM) for the temporary storage of information, and/or a Read-Only Memory (ROM), a Programmable Read-Only Memory (PROM), Erasable Programmable Read-Only Memory (EPROM), a One-time Programmable Read-Only Memory (OTPROM), Electrically-Erasable Programmable Read-Only Memory (EEPROM), Compact Disc Read-Only Memory (CD-ROM) for permanent storage of information. The memory 40 can also be an external storage system, such as a hard disk, a storage card, or a data storage medium. In at least one embodiment, the various types of non-transitory computer-readable storage mediums stored in the memory 40 can be processed by the at least one processor 30 to perform various functions, such as a method for detecting welding defects of workpieces as shown in FIG. 3.

Figure 2:
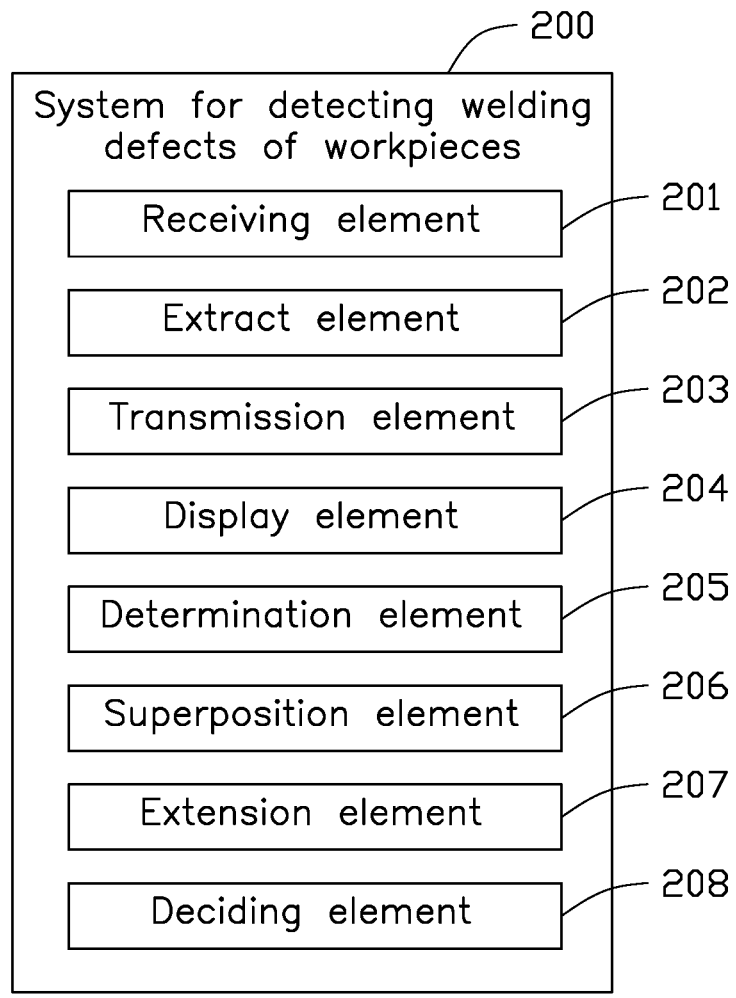
FIG. 2 is a schematic view of an embodiment of a system for detecting welding defects of workpieces according to the present disclosure.

FIG. 2 illustrates a system 200 for detecting welding defects of workpieces. In at least one embodiment, the system 200 includes one or more computer program instructions stored in the memory 40 and can be processed by the at least one processor 30 to perform functions of various of elements. The system 200 for detecting welding defects of workpieces includes a receiving element 201, an extract element 202, a transmission element 203, a display element 204, a determination element 205, a superposition element 206, an extension element 207, and a deciding element 208.

The receiving element 201 is configured to receive a first image from the image capturing element 20.

In at least one embodiment, the receiving element 201 is connected to the image capturing element 20 and is configured to receive the first image from the image capturing element 20.

The extract element 202 is configured to extract welding information from the first image.

In at least one embodiment, the extract element 202 extracts welding information of the welded-together stub and the flange from the first image.

The transmission element 203 is configured to transmit the welding information to a logic processing element to obtain welding defects. The logic processing element can be formed by evolution of self-learning of historical welding information.

In at least one embodiment, the logic processing element includes the extension element 207 and the deciding element 208.

The extension element 207 is configured to extend historical images to form a training set. The historical images include the first image being marked. The first image is cut, rotated, and flipped, so as to form a plurality of images, which can be added to the historical images. When a quantity of the historical images reaches a predetermined scale, the training set is formed by the quantity of historical images, which can improve an identification precision in applying the logic processing elements to the welding defects.

The transmission element 203 is further configured to transmit the training set to an initial model to form welding characteristics. The welding characteristics may include stub characteristics, flange characteristics, welding point characteristics, flange gap characteristics, and welding center characteristics formed by cutting the first image.

In at least one embodiment, the initial model is a semantic incision model which is untrained.

The transmission element 203 is further configured to transmit the welding characteristic to a classifier to form classified results. The classifier can be one or more than one. When there is more than one classifier, the classifiers can be flange contour classifiers, stub contour classifiers, welding point classifiers, flange gap classifiers, and welding point center classifiers.

The transmission element 203 is further configured to transmit historical welding defect information and the classified results to an evaluation model to form evaluation results. In the evaluation model, a part of the historical images is set aside after extension, such as twenty percent being set aside, as a verification set, which will not be used for training purposes. The rest of the historical images after extension, such as eighty percent, will be the training set. The training set is trained 100 times and the verification set is tested once. During the training, a function of the evaluation model is observed for convergence and whether precision of the verification set is improved.

The deciding element 208 is configured to determine whether the evaluation results match a predetermined condition. The predetermined condition includes convergence of loss function and a predetermined value of identification precision. When the evaluation results match the predetermined condition, based on the initial model and the evaluation results made, training templates are saved and form the logic processing element.

The display element 204 is configured to form display information of the welding defects and display the welding defects in visual form and/or characteristics values according to the display information. In at least one embodiment, the display information displays information after quantization. The display information is configured to present the welding defects in visual form and/or characteristics values. The welding defects in visual form means presenting the welding defects in a visualized form. The characteristics values indicate that a presentation of the welding defects in a data or table format.

The first image obtained by image capturing element 20 includes a first region, and the welding information extracted by the extract element 202 includes a first welding information. The first welding information is extracted based on the first region. The display information includes first display information, which corresponds to the welding defects expressed in the first welding information.

The determination element 205 is configured to determine whether the first region corresponds to the first display information.

In at least one embodiment, the first display information is generated based on the first image, the first region, and the first welding information, and thereby determining that a second image generated based on the first region.

The superposition element 206 is configured to add the first display information to a display region of the first region thereby generating the second image.

In at least one embodiment, the second image is generated by adding the first display information to the first image. The second image therefore includes the first image with welding defects, which provides visible welding defects in the first image for operators to observe.

In at least one embodiment, the method for detecting welding defects of workpieces may be applied in an apparatus, such as an apparatus 100 shown in FIG. 1. The functions may be integrated in the apparatus for the method for detecting welding defects of workpieces. In another embodiment, the method for detecting welding defects of workpieces can be run in a form of software development kit in the apparatus.

The method is provided by way of example, as there are a variety of ways to carry out the method. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 1.

At block 1, obtaining a first image from an image capturing element 20.

In at least one embodiment, the receiving element 201 is configured to obtain the first image from the image capturing element 20. The first image is an image of a first workpiece and a second workpiece welded together. The first workpiece can be a stub and the second workpiece can be a flange. The first image is an image of a stub and a flange welded together.

In another embodiment, the image capturing element 20 can be a charge coupled device (CCD) camera. When capturing an image of the stub and the flange welded together, the CCD camera is coaxial with laser to ensure that the CCD camera can capture the image of the stub and the flange in the maximal angle. The CCD camera is arranged above the stub and the flange. The CCD camera captures the image of the stub and the flange with plenty of light for good capturing quality.

At block 2, extracting welding information from the first image.

In at least one embodiment, the extract element 202 extracts welding information from the first image. The welding information includes at least one of a first contour (such as a contour of the stub in at least one embodiment), a second contour (such as a contour of the flange in at least one embodiment), welding positions (such as welding positions of the stub and the flange in at least one embodiment), welding defect points, and a welding center. The welding defect points can be gaps of the flange.

In at least one embodiment, the contour of the stub and the contour of the flange can be marked on the first image by operators. At least one of the defects of the flange, defects of inner ring of the stub, defects of the stub, welding defects, gaps of the flange.

Therefore, in the block 2, extracting welding information of at least one of contour of the stub, contour of the flange, welding positions, welding defect points, and a welding center from the first image.

At block 3, transmitting the welding information to a logic processing element to obtain welding defects.

In at least one embodiment, the logic processing element can be formed by evolution of self-learning of historical welding information. The transmission element 203 transmits the welding information to the logic processing element includes transmitting at least one of contour of the stub, contour of the flange, welding positions, welding defect points, and a welding center to the logic processing element.

In at least one embodiment, the welding defects includes at least one of a quantify of missing welding, a quantify of lacking welding, a ratio of over welding, a ratio of welding displacement, a ratio of welding defects, a ratio of welding holes, and a displacement degree of the stub.

The historical welding information includes at least one historical image marked by historical welding defects.

In at least one embodiment, collecting various of welding defects formed by the welding of the stub and the flange, forming the historical welding defects based on the various of welding defects formed by the welding of the stub and the flange, marking the historical welding defects to corresponding historical images to generate the historical welding information, which can be used to the self-learning of the logic processing element.

The logic processing element is configured to apply a semantic incision to the welding information, improve a cutting precise of the first image, apply the self-learning according to the historical welding information based on the high cutting precise.

Figure 4:
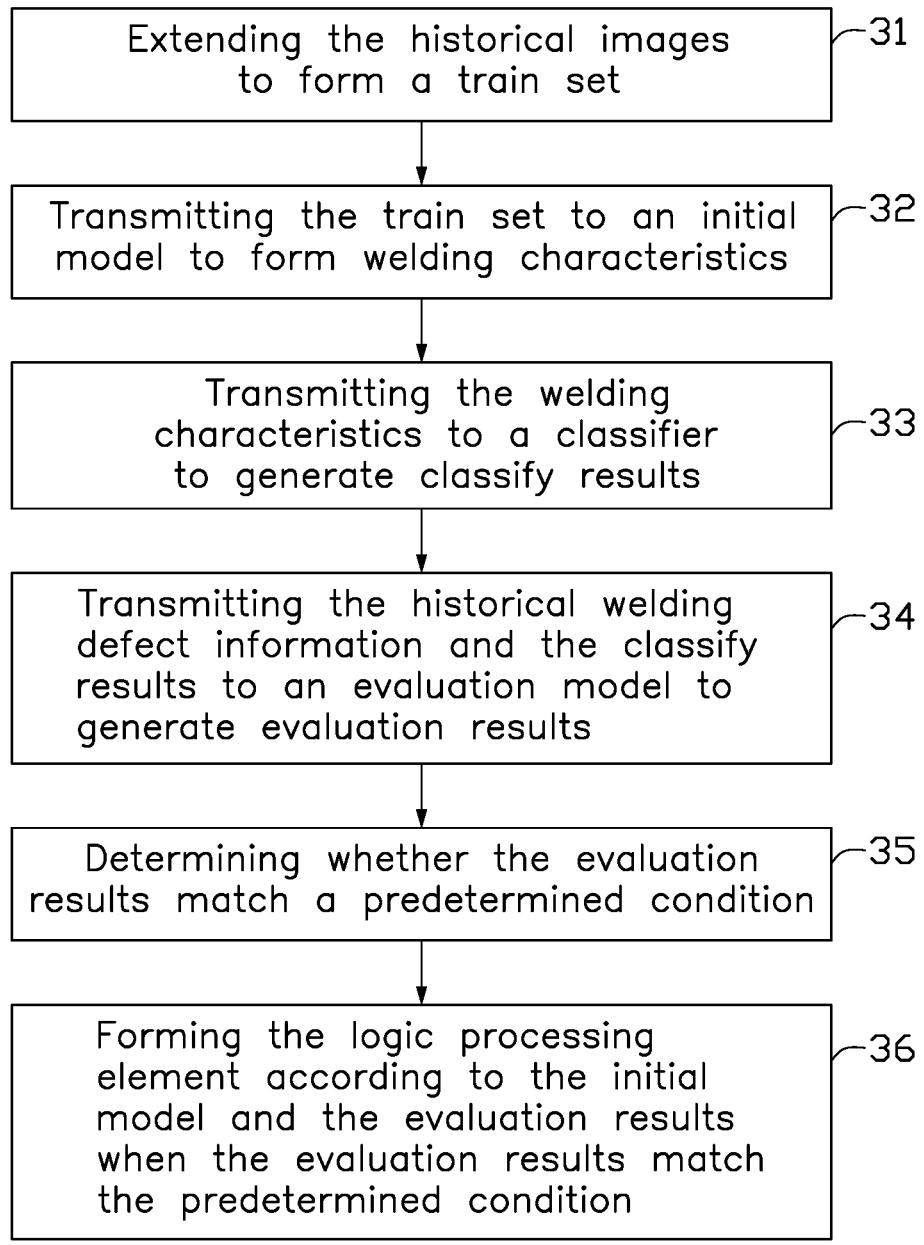
FIG. 4 illustrates a flowchart of an embodiment of a block 3 of the method of FIG. 3.

FIG. 4 illustrates a method for the logic processing element is formed by evolution of self-learning of historical welding information. The example method can begin at block 31.

At block 31, extending the historical images to form a training set.

In at least one embodiment, the first image is cut, rotated, flipped to form a plurality of images, which can be added to the historical images by the extension element 207. When a quantity of the historical images reaches a predetermined scale, a training set is formed by the quantity of historical images, which can improve an identifying precise of the logic processing element to the welding defects.

In at least one embodiment, the plurality of images have different angles and sizes, which can present as much welding positions as possible.

At block 32, transmitting the training set to an initial model to generate welding characteristics.

Figure 5:
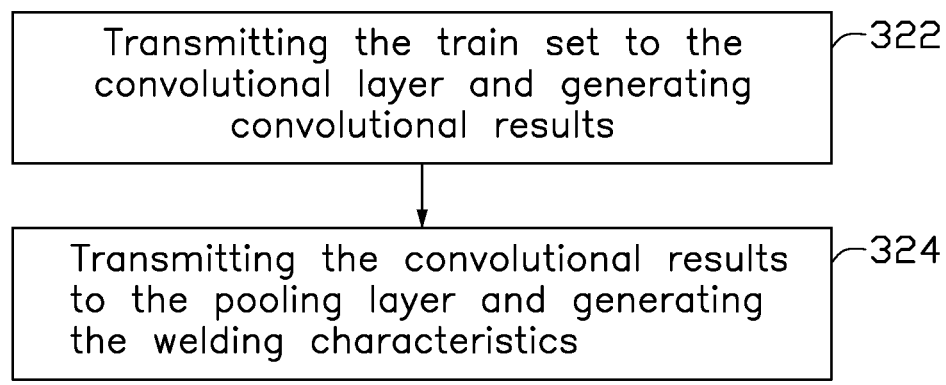
FIG. 5 illustrates a flowchart of an embodiment of a block 32 of the method of FIG. 4.

In at least one embodiment, the transmission element 203 transmits the training set to the initial model. The welding characteristics may include stub characteristics, flange characteristics, welding point characteristics, flange gap characteristics, and welding center characteristics generated by cutting the first image. By the welding characteristics, the logic processing element may identify various of welding information FIG. 5 illustrates a method for the transmitting the training set to an initial model to generate welding characteristics. The initial model is a semantic incision model that never be trained. The initial model includes at least a convolutional layer and a pooling layer. The example method can begin at block 322.

At block 322, transmitting the training set to the convolutional layer and generating convolutional results.

In at least one embodiment, the transmission element 203 transmits the training set to the convolutional layer, the convolutional layer cuts the historical images in the training set into a plurality of characteristics, and thereby generating convolutional results.

At block 324, transmitting the convolutional results to the pooling layer and generating the welding characteristics.

In at least one embodiment, the transmission element 203 transmits the convolutional results to the pooling layer, the pooling layer can be a pyramid pooling layer. The pooling layer transmits the historical images after being cut into a plurality of characteristics to the convolutional layer and restores the plurality of characteristics into the historical images. In a process of the historical images—the plurality of characteristics—the historical images, the logic processing element obtains the welding characteristics according to the training set, which can be used to identify characteristics of various of welding.

At block 33, transmitting the welding characteristics to a classifier to generate classified results.

In at least one embodiment, when there are more than one classifiers, the classifiers can be flange contour classifiers, stub contour classifiers, welding point classifiers, flange gap classifiers, welding point center classifiers. The transmission element 203 transmits the welding characteristics to the classifier, the classifier classify the welding characteristics to generate classified results.

At block 34, transmitting the historical welding defect information and the classified results to an evaluation model to generate evaluation results.

In at least one embodiment, the transmission element 203 transmits the historical welding defect information and the classified results to the evaluation model. In the evaluation model, setting a part of the historical images after extension, such as twenty percent, as a verification set, which will not be trained. The rest of the historical images after extension, such as eighty percent, as the training set. The training set is trained for 100 times and the verification set is tested for once. During the training, observing whether a function of the evaluation model is convergence and whether a precise of the verification set is improved.

At block 35, determining whether the evaluation results match a predetermined condition.

In at least one embodiment, the deciding element 208 determines whether the evaluation results match the predetermined condition. The predetermined condition includes convergence of loss function and a predetermined value of identification precision.

At block 36, forming the logic processing element according to the initial model and the evaluation results when the evaluation results match the predetermined condition.

In at least one embodiment, when the evaluation results is in a convergence range of the loss function and the identifying precise reach a predetermined condition, the logic processing element saves train templates for detecting welding defects of workpieces.

At block 4, generating display information of the welding defects and displaying the welding defects according to the display information.

The display element 204 displays the welding defects in the first image. The display information displays information after quantization. The display information is configured to present the welding defects in visual form and/or characteristics values. The welding defects in visual form indicates that a presentation of the welding defects in a visualization form. The characteristics values indicates that a presentation of the welding defects in a data or table format.

In at least one embodiment, the display information may include at least one of a quantify of missing welding, a quantify of lacking welding, a ratio of over welding, a ratio of welding displacement, a ratio of welding defects, a ratio of welding holes, and a displacement degree of the stub. The display information can present the welding defects above-mentioned.

At block 5, generating a second image according to the first image and the display information.

In at least one embodiment, the second image includes the first image with welding defects, thereby the welding defects can be shown in the image form.

The first image obtained by the image capturing element 20 includes a first region, which is substantially a region of the stub and the flange. The welding information includes first welding information, which is substantially include welding points and welding center of the stub and the flange. The first welding information is extracted based on the first region. The welding information is presented after the stub and the flange are presented in the first region.

The display information includes first display information, which is indicated to the welding defects corresponding to the first welding information. The display information presents welding defect information after the stub and the flange are welded.

The first image, the first region, the first welding information, and the first display information are generated in that order and corresponding to each other.

Figure 6:
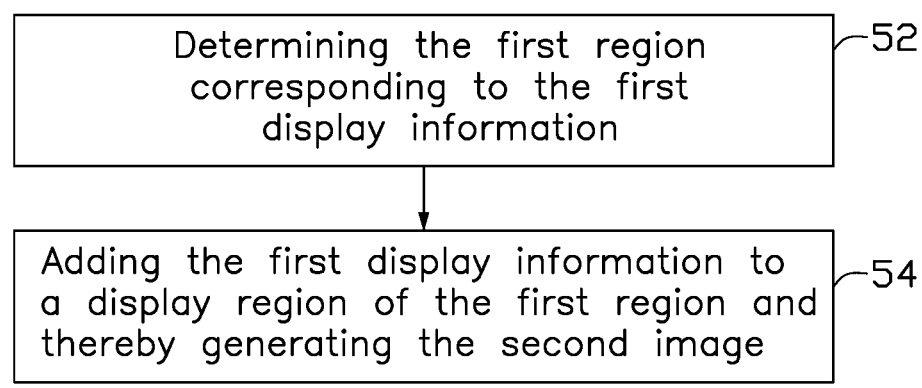
FIG. 6 illustrates a flowchart of an embodiment of a block 5 of the method of FIG. 3.

FIG. 6 illustrates a method for generating the second image. The example method can begin at block 52.

At block 52, determining the first region corresponding to the first display information.

In at least one embodiment, the determination element 205 determine that whether the first region corresponding to the first display information. The first display information is generated based on the first image, the first region, and the first welding information, and thereby determining that a second image generated based on the first region.

At block 54, adding the first display information to a display region of the first region and thereby generating the second image.

In at least one embodiment, the superposition element 206 adds the first display information to the first region. By adding the first display information including the welding defect information to the first region of the first image, the welding defects can be shown on the first image. Therefore, the second image provides welding defects in the first image to operators for being observed.

In other embodiments, the welding information may further include a first welding position and a second welding position. The method for obtaining welding defects can include:

Transmitting the first welding position and the second welding position to the logic processing element to obtain the welding defects. The welding defects include a first welding defect formed at the first welding position and a second welding defect formed at the second welding position.

Generating a first welding defect display information corresponding to the first welding defect and a second welding defect display information corresponding to the second welding defect, and displaying the welding defects in visual form and/or characteristics values of the welding defects according to the first welding defect display information and the second welding defect display information.

In at least one embodiment, the apparatus 100 includes instructions which can be predetermined and stored and elements can automatically calculate data and/or process information.

A non-transitory computer-readable storage medium including program instructions for causing the apparatus to perform the method for detecting welding defects of workpieces is also disclosed.

The method, apparatus, and non-transitory computer-readable storage medium for detecting welding defects of workpieces can be applied in a laser welding machine. A welding situation, including welding defects, of the stub and the flange can be easily observed by imaging. The method, apparatus, and non-transitory computer-readable storage medium for detecting welding defects of workpieces may identify the welding defects by self-learning, which can be applied to different welding defect detecting standard. Comparing to traditional welding defects detecting, every time defect standards change, models need to be trained for updating accordingly, however, the method, apparatus, and non-transitory computer-readable storage medium for detecting welding defects of workpieces does not need to train the models due to the self-learning, which can improve a detecting efficiency and saving human sources.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A method for detecting welding defects of workpieces comprising:
obtaining a first image from an image capturing element;
extracting welding information from the first image;
transmitting the welding information to a logic processing element to obtain welding defects;
wherein the logic processing element is formed by evolution of self-learning of historical welding information; and
generating display information of the welding defects and displaying the welding defects in visual form and/or characteristics values of the welding defects;
wherein the welding defects comprises at least one of a quantify of missing welding, a quantify of lacking welding, a ratio of over welding, a ratio of welding displacement, a ratio of welding defects, a ratio of welding holes, and a displacement degree of the first workpiece;
wherein the generating display information of the welding defects and displaying the welding defects in visual form and/or characteristics values of the welding defects comprises:
generating display information of the welding defects of at least one of the quantify of missing welding, the quantify of lacking welding, the ratio of over welding, the ratio of welding displacement, the ratio of welding defects, the ratio of welding holes, and the displacement degree of the first workpiece, and displaying the welding defects in visual form and/or characteristics values of the welding defects corresponding to the display information.

2. The method according to claim 1, further comprising:
generating a second image according to the first image and the display information.

3. The method according to claim 2, wherein the first image comprises a first region, the welding information comprises a first welding information, the first welding information is extracted based on the first region, the display information comprises first display information indicated to the welding defects corresponding to the first welding information;
wherein the generating the second image according to the first image and the display information comprises:
determining the first region corresponding to the first display information; and
adding the first display information to a display region of the first region and thereby generating the second image.

4. The method according to claim 1, wherein the welding information comprises at least one of a first contour of a first workpiece, a second contour of a second workpiece, welding positions, welding defect points, and a welding center, the first workpiece and the second workpiece are welded together;
wherein the transmitting the welding information to a logic processing element to obtain welding defects comprises:
extracting at least one of the first contour, the second contour, the welding positions, the welding defect points, and the welding center according to the first image; and
transmitting the at least one of the first contour, the second contour, the welding positions, the welding defect points, and the welding center to the logic processing element to obtain the welding defects.

5. The method according to claim 1, wherein the historical welding information comprises at least one historical image marked by historical welding defects;
wherein the logic processing element formed by evolution of self-learning of historical welding information comprises:
extending the historical images to form a training set;
transmitting the training set to an initial model to generate welding characteristics;
transmitting the welding characteristics to a classifier to generate classified results;
transmitting the historical welding defect information and the classified results to an evaluation model to generate evaluation results;
determining whether the evaluation results match a predetermined condition; and
forming the logic processing element according to the initial model and the evaluation results when the evaluation results match the predetermined condition;
wherein the predetermined condition comprises convergence of loss function and a predetermined value of identification precision.

6. The method according to claim 5, wherein the initial model is a semantic incision model and comprises a convolutional layer and a pooling layer;
wherein transmitting the training set to an initial model to generate welding characteristics comprises:
transmitting the training set to the convolutional layer and generating convolutional results; and
transmitting the convolutional results to the pooling layer and generating the welding characteristics.

7. The method according to claim 1, wherein the transmitting the welding information to a logic processing element to obtain welding defects comprises:
transmitting the welding information to the logic processing element to obtain welding characteristics of the welding information; and
transmitting the welding characteristics to a classifier to generate the welding defects.

8. The method according to claim 1, wherein the welding information comprises a first welding position and a second welding position;
wherein the transmitting the welding information to a logic processing element to obtain welding defects comprises:
transmitting the welding information to the logic processing element to obtain welding defects; wherein the welding defects comprises a first welding defect formed at the first welding position and a second welding defect formed at the second welding position; and
generating a first welding defect display information corresponding to the first welding defect and a second welding defect display information corresponding to the second welding defect, and displaying the welding defects in visual form and/or characteristics values of the welding defects according to the first welding defect display information and the second welding defect display information.

9. A apparatus for detecting welding defects of workpieces comprising:
at least one processor; and
at least one memory coupled to the at least one processor and storing program instructions;
the memory and the program instructions configured to, with the at least one processor, cause the apparatus to perform:
obtaining a first image from an image capturing element;
extracting welding information from the first image;
transmitting the welding information to a logic processing element to obtain welding defects;
wherein the logic processing element is formed by evolution of self-learning of historical welding information; and
generating display information of the welding defects and displaying the welding defects in visual form and/or characteristics values of the welding defects;
wherein the welding defects comprises at least one of a quantify of missing welding, a quantify of lacking welding, a ratio of over welding, a ratio of welding displacement, a ratio of welding defects, a ratio of welding holes, and a displacement degree of the first workpiece;
wherein the generating display information of the welding defects and displaying the welding defects in visual form and/or characteristics values of the welding defects comprises:
generating display information of the welding defects of at least one of the quantify of missing welding, the quantify of lacking welding, the ratio of over welding, the ratio of welding displacement, the ratio of welding defects, the ratio of welding holes, and the displacement degree of the first workpiece, and displaying the welding defects in visual form and/or characteristics values of the welding defects corresponding to the display information.

10. The apparatus according to claim 9, wherein the memory and the program instructions configured to, with the at least one processor, cause the apparatus further to perform:
generating a second image according to the first image and the display information.

11. The apparatus according to claim 10, wherein the first image comprises a first region, the welding information comprises a first welding information, the first welding information is extracted based on the first region, the display information comprises first display information indicated to the welding defects corresponding to the first welding information;
wherein the generating the second image according to the first image and the display information comprises:
determining the first region corresponding to the first display information; and
adding the first display information to a display region of the first region and thereby generating the second image.

12. The apparatus according to claim 9, wherein the welding information comprises at least one of a first contour of a first workpiece, a second contour of a second workpiece, welding positions, welding defect points, and a welding center, the first workpiece and the second workpiece are welded together;

wherein the transmitting the welding information to a logic processing element to obtain welding defects comprises:
extracting at least one of the first contour, the second contour, the welding positions, the welding defect points, and the welding center according to the first image; and
transmitting the at least one of the first contour, the second contour, the welding positions, the welding defect points, and the welding center to the logic processing element to obtain the welding defects.

13. The apparatus according to claim 9, wherein the historical welding information comprises at least one historical image marked by historical welding defects;
wherein the logic processing element formed by evolution of self-learning of historical welding information comprises:
extending the historical images to form a training set;
transmitting the training set to an initial model to generate welding characteristics;
transmitting the welding characteristics to a classifier to generate classified results;
transmitting the historical welding defect information and the classified results to an evaluation model to generate evaluation results;
determining whether the evaluation results match a predetermined condition; and
forming the logic processing element according to the initial model and the evaluation results when the evaluation results match the predetermined condition;
wherein the predetermined condition comprises convergence of loss function and a predetermined value of identification precision.

14. The apparatus according to claim 13, wherein the initial model is a semantic incision model and comprises a convolutional layer and a pooling layer;
wherein transmitting the training set to an initial model to generate welding characteristics comprises:
transmitting the training set to the convolutional layer and generating convolutional results; and
transmitting the convolutional results to the pooling layer and generating the welding characteristics.

15. The apparatus according to claim 9, wherein the transmitting the welding information to a logic processing element to obtain welding defects comprises:
transmitting the welding information to the logic processing element to obtain welding characteristics of the welding information; and
transmitting the welding characteristics to a classifier to generate the welding defects.

16. The apparatus according to claim 9, wherein the welding information comprises a first welding position and a second welding position;
wherein the transmitting the welding information to a logic processing element to obtain welding defects comprises:
transmitting the welding information to the logic processing element to obtain welding defects; wherein the welding defects comprises a first welding defect formed at the first welding position and a second welding defect formed at the second welding position; and
generating a first welding defect display information corresponding to the first welding defect and a second welding defect display information corresponding to the second welding defect, and displaying the welding defects in visual form and/or characteristics values of the welding defects according to the first welding display information and the second welding defect display information.

17. A non-transitory computer readable medium comprising program instructions for causing an apparatus to perform a method comprising:

obtaining a first image from an image capturing element;

extracting welding information from the first image;

transmitting the welding information to a logic processing element to obtain welding defects;

wherein the logic processing element is formed by evolution of self-learning of historical welding information; and generating display information of the welding defects and displaying the welding defects in visual form and/or characteristics values of the welding defects;

wherein the welding defects comprises at least one of a quantify of missing welding, a quantify of lacking welding, a ratio of over welding, a ratio of welding displacement, a ratio of welding defects, a ratio of welding holes, and a displacement degree of the first workpiece;

wherein the generating display information of the welding defects and displaying the welding defects in visual form and/or characteristics values of the welding defects comprises:

generating display information of the welding defects of at least one of the quantify of missing welding, the quantify of lacking welding, the ratio of over welding, the ratio of welding displacement, the ratio of welding defects, the ratio of welding holes, and the displacement degree of the first workpiece, and displaying the welding defects in visual form and/or characteristics values of the welding defects corresponding to the display information.

* * * * *